Patented Aug. 25, 1925.

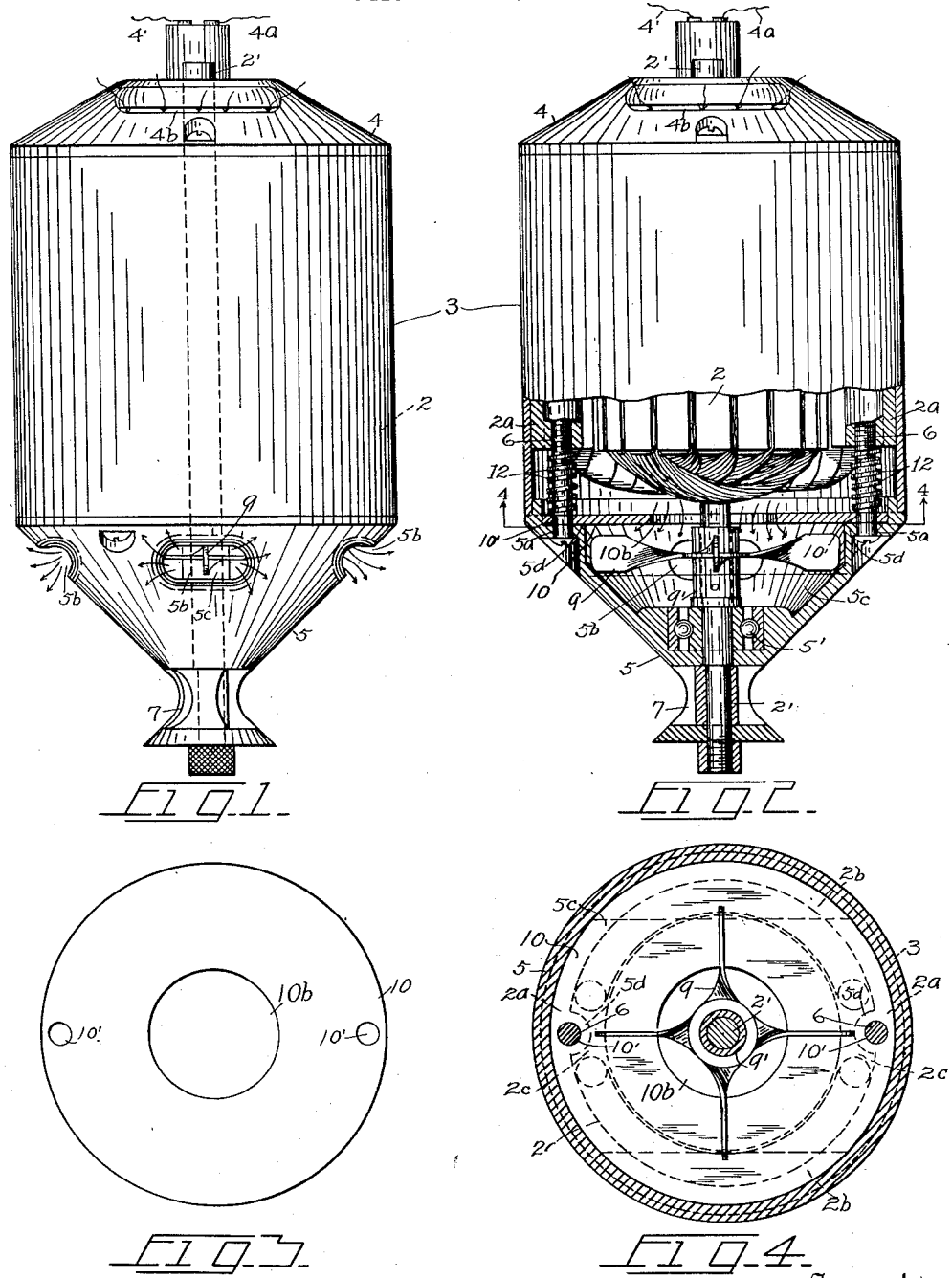

1,551,236

UNITED STATES PATENT OFFICE.

RAY L. CARTER, OF SYRACUSE, NEW YORK.

MEANS FOR COOLING HIGH-SPEED MOTORS.

Application filed October 10, 1923. Serial No. 667,756.

*To all whom it may concern:*

Be it known that I, RAY L. CARTER, a citizen of the United States, residing at Syracuse, in the county of Onondaga and State of New York, have invented certain new and useful Improvements in Means for Cooling High-Speed Motors, of which the following is a specification.

This invention relates to novel, simple and effective means for air-cooling the high-speed electric motors, which drive portable shapers, routers and profilers, of the classes shown in my United States Patent #1,433,497, dated Oct. 24, 1922, and in my pending application, Serial No. 665,644, to the end that smaller motors, which the operator may conveniently hold in one hand while performing their work, and which may be operated at relatively high speeds for producing adequate power for the various tools, may be employed, instead of the slower and less powerful motors in common use.

Heretofore, these small motors have usually been constructed to operate at from 5,000 to 7,000 R. P. M., and the motors have been inclosed by tubular casings, which allow the free circulation of air between and around the fields and armatures for cooling the same. The opposite ends of these casings are usually closed by hollow vented caps, of peculiar form, which also serve as bearings for the opposite ends of the armature shafts. The cooling of the older motors has been effected by means of relatively small rotary fans, which are usually mounted on the armature shafts within one of the hollow caps; the fans being arranged to draw the air longitudinally through the casings, and to evacuate the same through the exit-openings of the corresponding caps. As long as the motors and fans are operated at the aforesaid speeds, the machines are readily maintained at suitable temperatures, both for safe-guarding the motors and for the comfortable handling of the devices with the naked hands. It has been found, however, that when the motors are limited to maximum speeds of say up to 7,000 R. P. M., the machines do not always perform satisfactory work, as, for example, when operating upon the harder varieties of woods, such as oak, maple, birch and the like, which offer greater resistance to the cutting of the tools, than the softer woods, such as pine, whitewood, poplar and the like. It is necessary, therefore, to obtain more power, without materially changing the size and arrangement of the motor and related parts. To this end, it is proposed to provide motors for the machines herein referred to that may be operated at approximately 14,000 R. P. M., for yielding the requisite power. This abrupt stepping-up of the speed, however, without correspondingly enlarging the ventilating fan, has developed a new danger, namely, that of over-heating the devices to such extent that, the motors frequently burn out, and the casings become so hot that the operators cannot hold them with bare hands.

To remedy this defect or trouble, and preserve the standard character of the parts of the machines, it is a particular object of the present invention to associate with the fan an element, by means of which the suction or draft of the fan may be increased in proportion to the acceleration of the motor, and thereby effect the proper cooling of the motor. This new element preferably consists of a baffle plate or disc, which is disposed concentrically within the larger conical portion of the motor casing, and which divides the ventilating chamber in a manner to properly proportion the space in which the fan operates to the size of the fan, thereby overcoming the tendency of the fan to churn rather than evacuate the hot air. This baffle disc is preferably disposed parallel and relatively close to the plane of rotation of the fan, and in order to effectively cool the motor, the center of the disc is cut away for providing a circular opening whose diameter bears a definite relation to the diameter of the fan. And a further object is to provide novel means for securing and holding the baffle disc in place.

I obtain these objects by the means set forth in the detailed description which follows, and as illustrated by the accompanying drawing, in which—

Figure 1 is an elevational view of the encased motor, with shaping-tool attached. Fig. 2 is a partial elevation and partial central longitudinal section of the same. Fig. 3 is a plan view of the baffle disc, and Fig. 4 is a horizontal section taken on line 4—4 of Fig. 2.

In the drawing, 2 represents generally the motor, and 2' is the armature shaft thereof. The motor is preferably inclosed in a cylindrical casing 3, which protects, and affords convenient and safe means for ventilating and handling the motor. The opposite ends of the casing are inclosed by hollow conical caps 4 and 5. The motor may be driven by electric current derived from any suitable source, which may be conducted to the motor by wires 4'—4ᵃ. The caps 4—5 form the bearings for the armature-shaft 2'; and cap 5 comprises a relatively large hollow body, in which ball-bearings 5' are disposed. Cap 5 is held in place by bolts 6, which pass through holes 5ᵃ in the cap, and are shown threaded into the field-magnets 2ᵃ, (see Figs. 2 and 4). Both of the caps are provided with openings, as 4ᵇ—5ᵇ, for admitting and expelling air for cooling the motor, as shown by the arrows in Figs. 1 and 2. The angle of the outer face of the cone 5 is preferably 45°, and this external surface is especially provided and arranged for guiding and accurately gaging the cutting tool 7, while performing certain shaping and other work. As a rule, but one form of gage caps is provided for the machines, of the classes named, and for that reason the caps 5 are all preferably constructed from a common pattern and are interchangeable. The hollow interiors, as 5ᶜ, of the caps 5 are therefore of about the same area or capacity; and as all the motors are substantially the same size, the cavity or free space 5ᶜ, between the ball-bearings 5' and the corresponding end of the motor parts, is usually the same as shown in Figs. 2. The motor 2—2' is so constructed and arranged that the air may circulate freely between the fields, the field magnets 2ᵃ, and the casing 3, as well as between the armature 2' and the fields, as best seen at 2ᵇ—2ᶜ in Fig. 4. The mechanical means for cooling the motor consists of a relatively small three or four blade fan 9, which is supported by a sleeve 9', the latter being rigidly mounted on the armature-shaft 2'. The fan 9 is disposed in the only available place, and being preferably positioned directly in the line of the circular row of vents 5ᵇ, is arranged to draw the air lengthwise through the motor and its casing, and then evacuate the same through the said vents. As hereinabove explained, the motor 2 is preferably constructed to drive the armature and tool, as 7, at approximately 14,000 R. P. M., and in order to insure proper cooling of the motor and related parts, it has been found necessary to divide or reduce the fan chamber 5ᶜ, so as to prevent the fan from churning, instead of expelling the air. For this purpose, I provide a plane circular plate or disc 10, having a diameter substantially equal to the greatest diameter of the chamber 5ᶜ, which corresponds to the mouth of the cap 5, and I dispose the said disc in the said mouth, where it is supported by similar semi-circular ledges 5ᵈ of said cap, through which the bolts 6 pass. The disc 10 is perforated at 10' to receive the bolts 6, as shown in Figs. 2, 3, and 4. The disc is held in place by the bolts 6, and also by compression springs 12, which are carried by said bolts, the opposite ends of said springs respectively engaging the field-magnets 2ᵃ, and the inner face of the disc 10. By employing the springs 12 any discrepancy in the distance between the disc and the magnets 2ᵃ is taken care of by the springs themselves when the bolts 6 are tightened up. The center of the disc is cut away to provide a circular opening 10ᵇ, concentric to the shaft 2' and cap 5, through which alone the fan draws the air from the motor compartment, into the fan chamber 5ᶜ, from which it is blown out through the slotted openings 5ᵇ, as shown by the arrows, in Figs. 1 and 2. To cool the motor, when it is driven at highest speed named, it has been found that the best results are attained when the disc 10 is spaced a small fraction of an inch from and parallel to the plane of rotation of the fan, and that the maximum suction or draft occurs when the diameter of the opening 10ᵇ is substantially one-half the diameter of the circle described by the tips of the fan blades, as shown in Fig. 2. By this construction and arrangement the motor 2 may be operated up to and even at higher speeds than 14,000 R. P. M., without danger of the motor or casing becoming injuriously or uncomfortably heated.

The disc 10 is an extremely simple part, and its disposition and retention means are equally simple. The entire ventilating improvement may be produced and installed at small cost, and without requiring any alteration or change in the construction and arrangement of the standard cap 5, or the motor and its casing 3. When motors equipped with my improvement are operated at the extremely high speeds referred to, the temperature of the motor and related parts is substantially the same as when the machines are idle.

Having thus described my invention, what I claim, is—

1. The combination with a motor, a casing inclosing the motor, a hollow cap closing one end of the casing, and a rotatable fan driven by said motor and disposed in said cap, of a disc interposed between the motor and said fan for preventing the fan from churning the air, the said disc having a relatively small central opening through which the fan sucks the air from the motor compartment into the fan chamber for cooling the motor, and resilient means interposed between the casing and the disc for holding the latter against the cap.

2. In combination, a motor casing, an end cap therefor, a baffle plate fitting against the inner portion of the end cap, and forming therewith a fan chamber, and springs interposed between the casing and the baffle plate for resiliently holding the latter in position against the end cap.

3. In combination, a motor casing, an end cap therefor, a baffle plate fitting against the inner portion of the cap for forming therewith a fan chamber, fastening bolts passing through the cap and baffle plate for securing the same to the casing, and springs encircling the bolts between the baffle plate and the casing for resiliently holding the baffle plate in position.

In testimony whereof I affix my signature.

RAY L. CARTER.